E. TURNER.
OVEN.
APPLICATION FILED NOV. 8, 1915.

1,198,169.

Patented Sept. 12, 1916.
8 SHEETS—SHEET 1.

Inventor.
Ernest Turner

E. TURNER.
OVEN.
APPLICATION FILED NOV. 8, 1915.

1,198,169.

Patented Sept. 12, 1916.
8 SHEETS—SHEET 2.

E. TURNER.
OVEN.
APPLICATION FILED NOV. 8, 1915.

1,198,169.

Patented Sept. 12, 1916.
8 SHEETS—SHEET 8.

UNITED STATES PATENT OFFICE.

ERNEST TURNER, OF HULME, MANCHESTER, ENGLAND.

OVEN.

1,198,169.      Specification of Letters Patent.      Patented Sept. 12, 1916.

Application filed November 8, 1915. Serial No. 60,382.

*To all whom it may concern:*

Be it known that I, ERNEST TURNER, a subject of the King of Great Britain, residing at Newcastle and Wilmott street, Hulme, Manchester, in the county of Lancaster, England, have invented certain new and useful Improvements Relating to Ovens, of which the following is a specification.

This invention relates particularly to mechanically operated drying or cooking ovens and has for its chief object to provide an oven in which the drying or cooking chamber as well as the oven frame is made up of interchangeable sections or units adapted when assembled together to permit of varying sizes of ovens being constructed according to the number of sections used.

Another object is to provide a renewable and readily accessible cooking or drying chamber with which a novel chain tensioning device may be employed.

A further object is to provide a system of heating which will fulfil the requirements of the varied purposes for which the oven may be employed.

According to the present invention the frame of the oven consists of a number of interchangeable units or sections, so that an oven frame of any desired length can be built up from stock sections. The drying or cooking chamber itself, when constructed to be separable from the oven frame is composed, in the case of large ovens, of stock sections adapted to be secured by bolts or the like to the oven frame sections. In the case of small ovens the drying or cooking chamber may be constructed in one piece or in a few pieces only. In either case it will be understood that an oven of this kind is readily transportable and can easily be lengthened to suit requirements.

The oven walls, which are secured to the frame by bolts, or otherwise, may consist of composite sheets or slabs of steel and refractory material held together by the sheet metal, and the top or roof of the oven may be a similar composite slab or a sheet of steel. The roof, floor and walls of the cooking chamber may be composed of composite slabs or of sheets of corrugated, indented or otherwise stiffened metal.

With regard to the mechanical operation of the oven, endless conveyer chains may pass over loose sprocket wheels or guide pulleys at the intake end of the oven, and along the drying or cooking chamber, and thence over driving sprocket wheels at the off-take end of the oven. The return portions of the chains are arranged to pass along suitable guides beneath the drying or cooking chamber proper, sufficient spaces being left between these guides and the loose sprocket wheels or guide pulleys to enable the weight of the unsupported lengths of chain to keep the lengths actually within the chamber taut and to take up any increase of length due to expansion of the chains. In order to insure that the chains shall retain their heat, the return portions can travel in a chamber provided immediately beneath the drying or cooking chamber proper; this additional chamber may extend along the whole length of the oven or only along a portion near the intake end, and may be constructed similarly to the drying or cooking chamber proper.

The type of chain employed may vary according to requirements, but in many cases a satisfactory arrangement is to employ tubular carrier bars serving the double function of spacing bars and carrier bars, their ends being passed through holes in the links of the chains and secured thereto by pins or otherwise.

In order that the invention may be clearly understood and readily carried into effect the same will now be described more fully with reference to the accompanying drawings, in which:—

Figs. 14 and 15 are detail views hereinafter referred to. Fig. 17 shows a preferred construction of feed chain; and Figs. 18 to 26 show modifications and details of construction hereinafter more particularly referred to.

Figure 1:
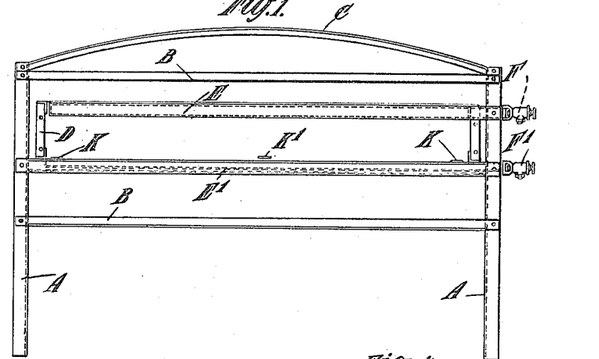
Figures 1 and 2 are end and side elevations respectively of one section of an oven frame with drying chamber frame in accordance with the present invention, the provision for heating being by means of gas and such that the products of combustion can enter the cooking chamber.
Figure 2:
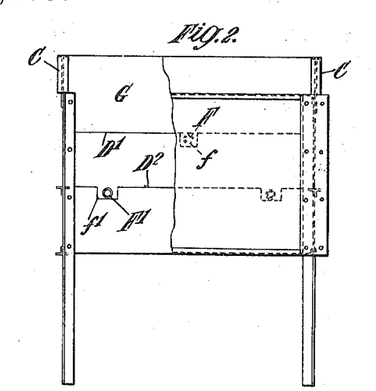
Figure 3:
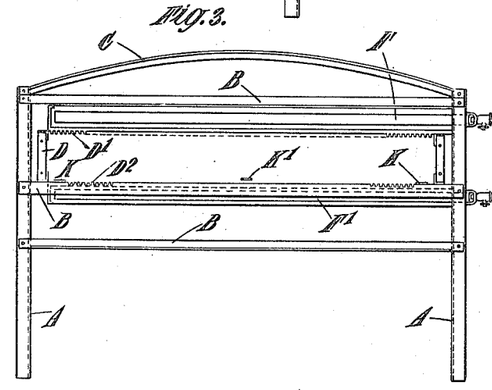
Figs. 3 and 4 are end and side elevations respectively of a section of a modified form of oven frame, in which the products of combustion of the heating gas or gases are excluded from the cooking chamber.
Figure 4:
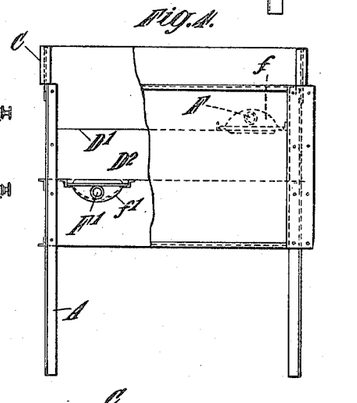
Figure 5:
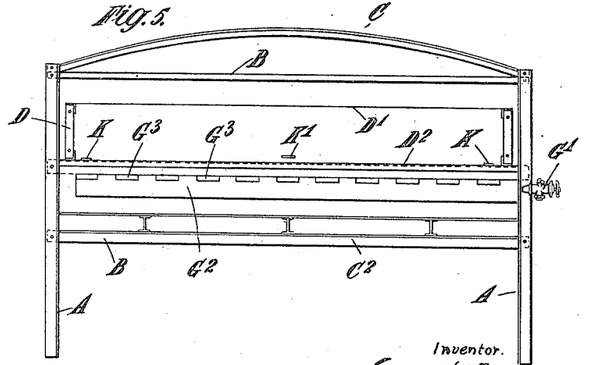
Figs. 5 and 6 are end and side elevations respectively of a section of a further modified form of oven frame, in which oil is employed for heating.
Figure 6:
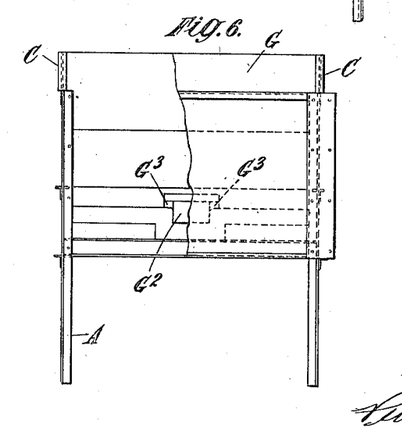
Figure 7:
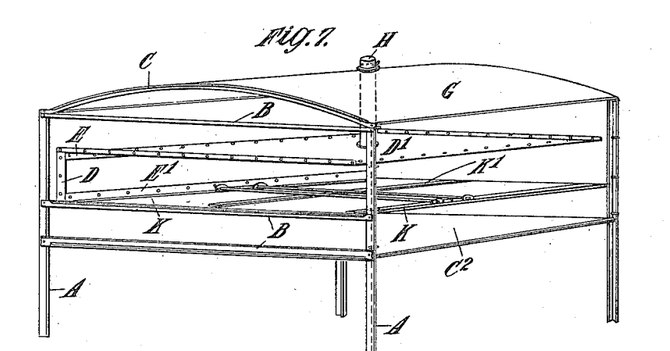
Fig. 7 is a perspective view of the framework of a stock section of oven and chamber.
Figures 17, 17A, 18, 19, 20, 23, 24, 25:
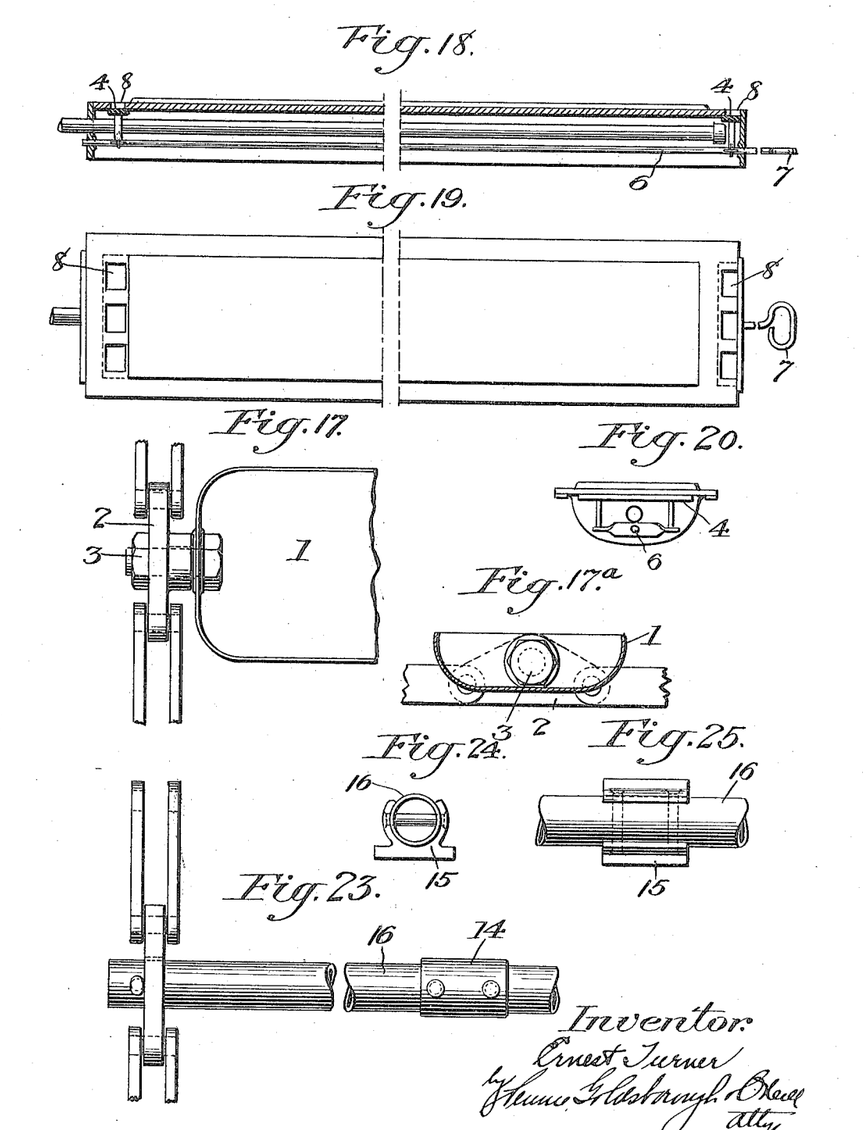
Figure 21:
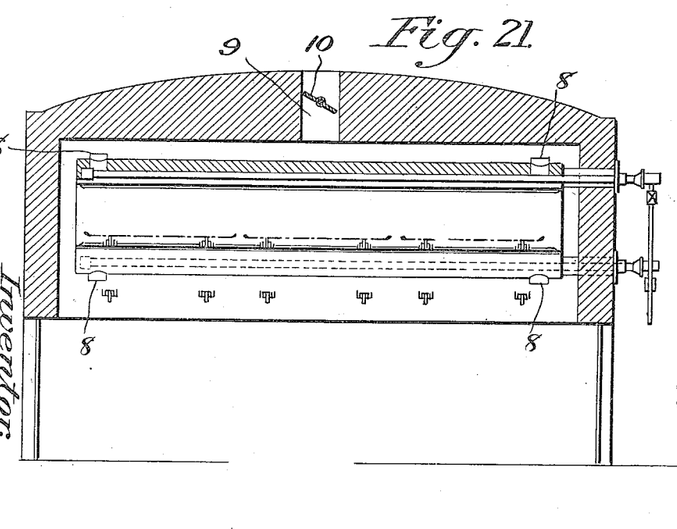

Referring first to Figs. 1 to 7, each section of the oven frame comprises uprights or standards A, horizontal members B, and arched roof members C, assembled and bolted together as shown. Similarly the section of the frame of the cooking chamber comprises uprights or standards D, top and bottom horizontal members E and E' respectively, the bottom members E' being secured to the middle horizontal members B of the oven frame. G represents the roof sheeting or composite slab extending between the arched roof members C. D' is the roof, and $D^2$ the floor, of the cooking chamber; these may be composed of metal sheets, corrugated, indented, or otherwise stiffened to increase their rigidity wherever desired and in cases where very high temperatures are not required their internal surface may be lined with porcelain tiles, or the steel sheets may be enameled. $C^2$ is the floor of a chamber beneath the cooking chamber proper. F and F' are upper and lower gas supply pipes extending transversely across the cooking chamber. In Figs. 1 and 2 it is to be noted that the gas supply pipes F, F' are situated within the cooking chamber, the lower pipes F' being housed in channels in the floor $D^2$. In Figs. 3 and 4 the gas supply pipes F, F' are located outside the cooking chamber and are housed in separate pockets or chambers $f, f'$ respectively. The pockets or chambers $f, f'$ may be lined with heat resisting material and may be provided with damper slides 4 (Figs. 18, 19 and 20). The damper slides 4 are provided with valves 8 and connected by a rod 6 with the control handle 7, so that some of the products of combustion may be admitted to the cooking chamber at any time, as desired. In Fig. 3 the roof and floor of the cooking chamber are shown as plain sheets with corrugated radiators inserted. In Figs. 5 and 6 the heating is effected by the combustion of liquid fuel, the oil being supplied through an injector G' and the products of combustion passing out laterally from the combustion chamber $G^2$ through ports $G^3$ in the space beneath the floor of the cooking chamber and thence into a separate flue. In the perspective view, Fig. 7, a flue or chimney H is shown extending upward from the roof of the cooking chamber through the roof of the oven, to enable steam or vapors evolved during cooking, or products of combustion, to be conveyed away. When the form of construction of the oven is such that the results of combustion do not pass through the cooking chamber, separate flues 9 (Fig. 21) are provided, having a butterfly valve 10, so that the products of combustion may pass clear of the cooking chamber.

Figure 8:
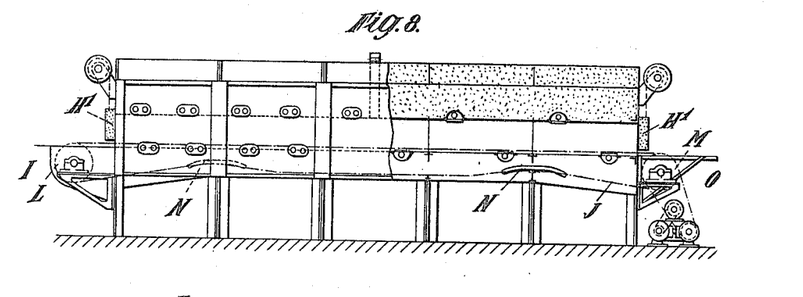
Fig. 8 is a longitudinal sectional elevation and Fig. 9 a cross sectional elevation of a complete oven constructed in accordance with the present invention.
Figure 9:
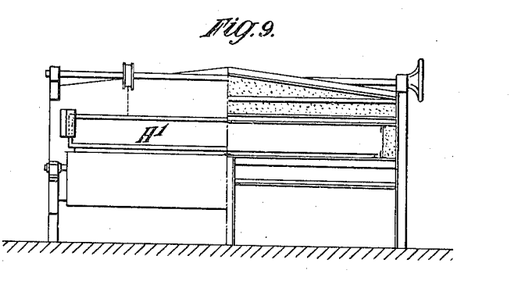
Figure 11:
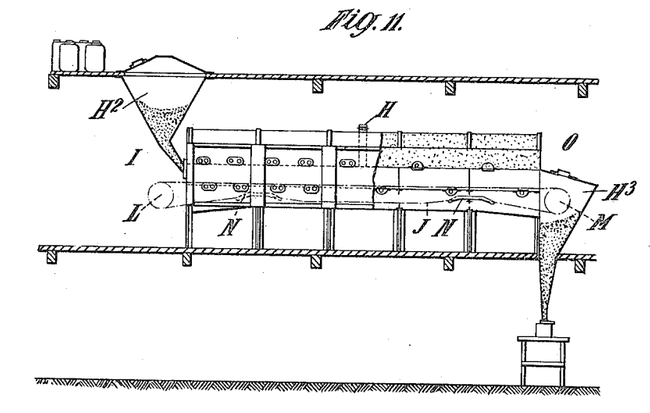
Fig. 11 is a longitudinal sectional elevation of a modified form of a complete oven.
Figure 14:
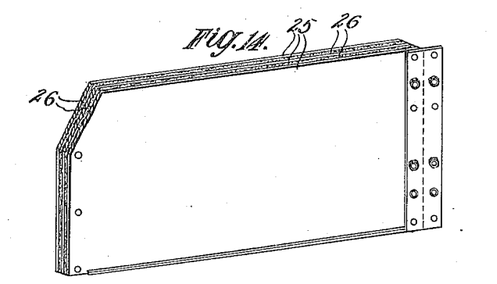
Figure 15:
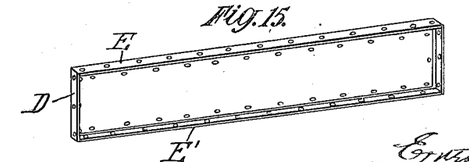

In all constructional forms of the oven, the walls may be secured to the frame by bolts or otherwise and may consist of composite sheets (Fig. 14) or slabs of steel 25 alternating with refractory material 26 such as asbestos, cement, fireproof wood, or two or more of such materials, held together by the sheet metal, and the top or roof of the oven may be constructed of similar composite slabs, or of a plain sheet of steel. The space between the oven walls and roof and the cooking chamber may be filled as shown in Figs. 8, 9 and 11 with suitable material, such as slag wool, to heat-insulate the chamber, one of the sides of the chamber being shown separately at Fig. 15. Sliding doors H' are provided at the ends of the cooking chamber together with means for raising and lowering the doors as desired. The modified form of oven shown in Fig. 11 is adapted for cooking or drying granulated material, a feeding hopper $H^2$ being arranged at the intake end of the oven and a receiving hopper or chute $H^3$ at the out-take end.

Figure 22:
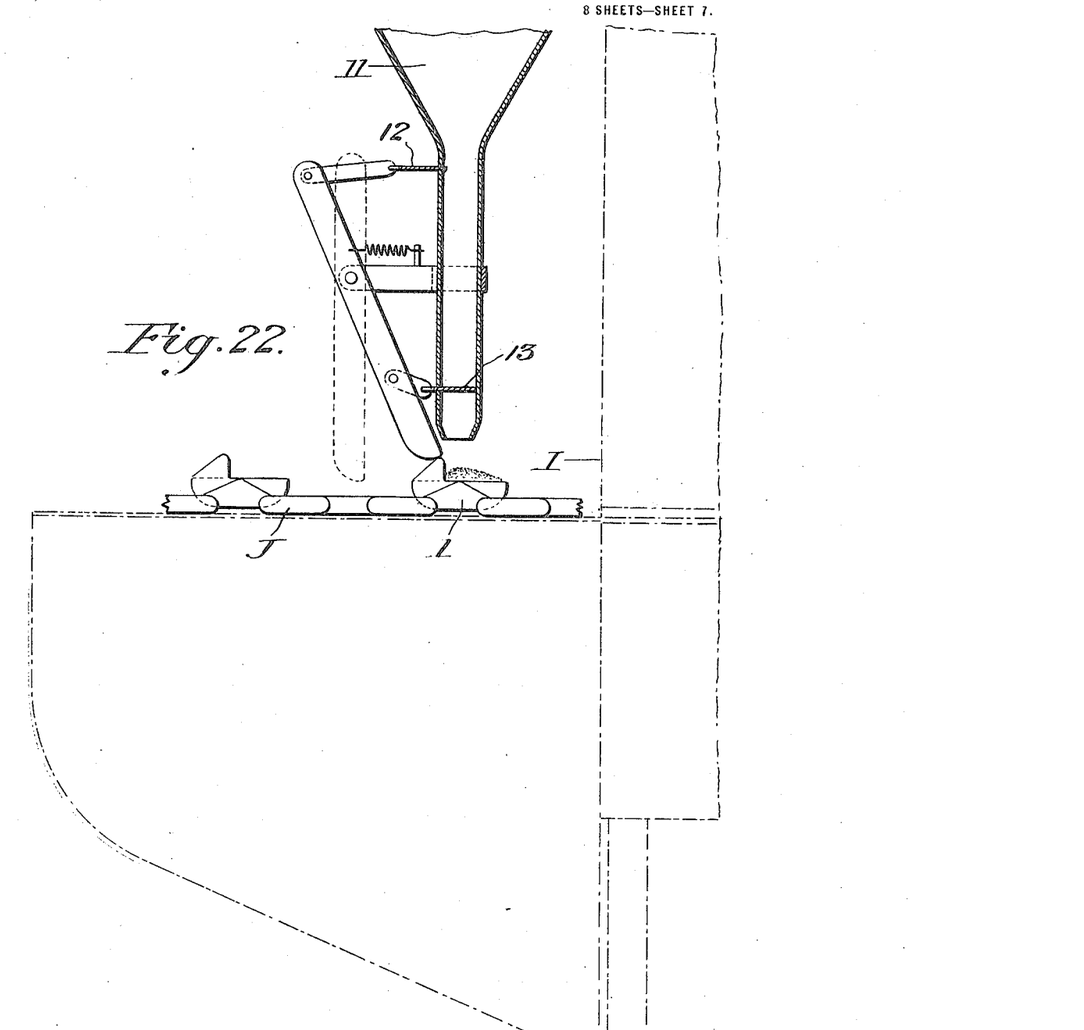

The material to be dried or cooked is conveyed in buckets 1 (Figs. 17 and 22) through the chamber from the intake end I (Fig. 8) to the out-take end O, by means of endless chains J to which the aforesaid buckets are attached, the material being fed into or placed upon the buckets. The material may be fed from a hopper 11 (Fig. 22), the mouth of which is adapted to be opened and closed by appropriate means adapted to work against the spring controlled shutters 12, 13 (Fig. 22) the action being such that as a bucket arrives beneath the mouth of the hopper, the shutter is shifted into its open position, as shown in dotted lines in Fig. 22 but closes again just prior to the movement of the bucket away from its position beneath the hopper mouth.

Figure 16:
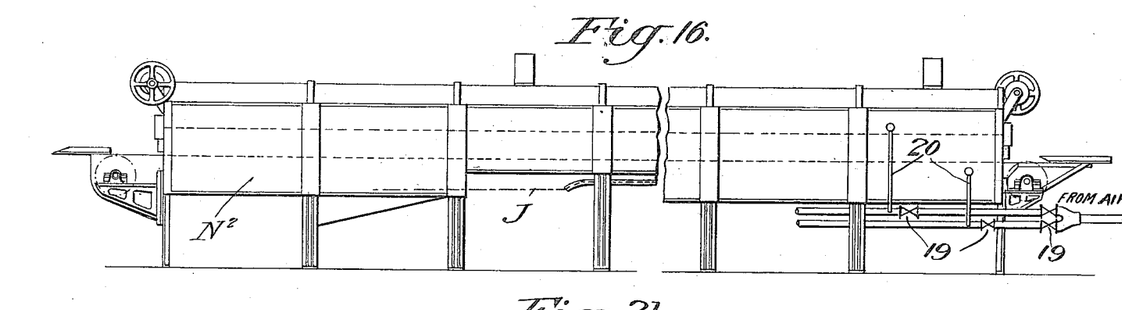
Fig. 16 shows a modification in which the additional chamber is arranged near the intake end of the furnace.

The endless chains J are adapted to run on longitudinal girders or supports K near the edges of the floor of the chamber, a central supporting plate K' being provided in the case of broad ovens to offer a central support to cross bars 16 connecting the chains together. When a central support is provided, the corresponding portions of the cross bars may be furnished with ferrules 14 (Fig. 23) or shoes 15 (Figs. 24 and 25) to bear upon the central support K'. The conveyer chains J pass over loose sprocket wheels or guide pulleys L at the intake end I of the oven, and along the plates K within the drying or cooking chamber, and thence over driving sprocket wheels M at the offtake end O of the oven. The return portions of the chains are arranged to pass along suitable guides N in the chamber N² beneath the drying or cooking chamber proper, sufficient spaces being left between these guides N and the loose sprocket wheels or guide pulleys L to enable the weight of the unsupported lengths of chain to keep the lengths actually within the chamber taut and to take up any increase of length due to expansion of the chains. In order to insure that the chains shall retain their heat, the return portions can travel in the chamber provided immediately beneath the drying or cooking chamber proper; this additional chamber may extend along the whole length of the oven N' (Fig. 8), or only along part near the intake end N² (Fig. 16), and may be constructed similarly to the drying or cooking chamber proper. The type of chain employed may vary according to requirements, but in many cases a satisfactory arrangement is to employ tubular carrier bars 16 (Fig. 23) serving the double function of spacing bars and carrier bars, their ends being passed through holes in the links of the chains and secured thereto by bolts 3.

Figure 26:
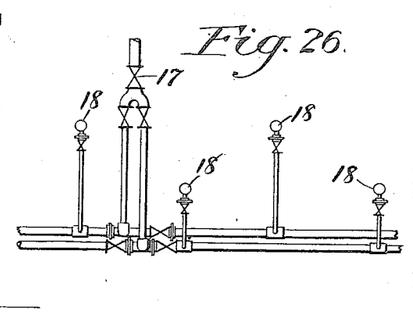

As already explained the heating may be effected by means of gaseous or liquid fuel alone or in conjunction with steam, and in some cases the product of combustion may be allowed to enter the drying or cooking chamber. The gas or fuel burners may be arranged for control and also for collective control at any desired point preferably at the center or at the off-take end of the oven, in which case a main cock 17 is provided to control the burners 18 (Fig. 26).

Figure 10:
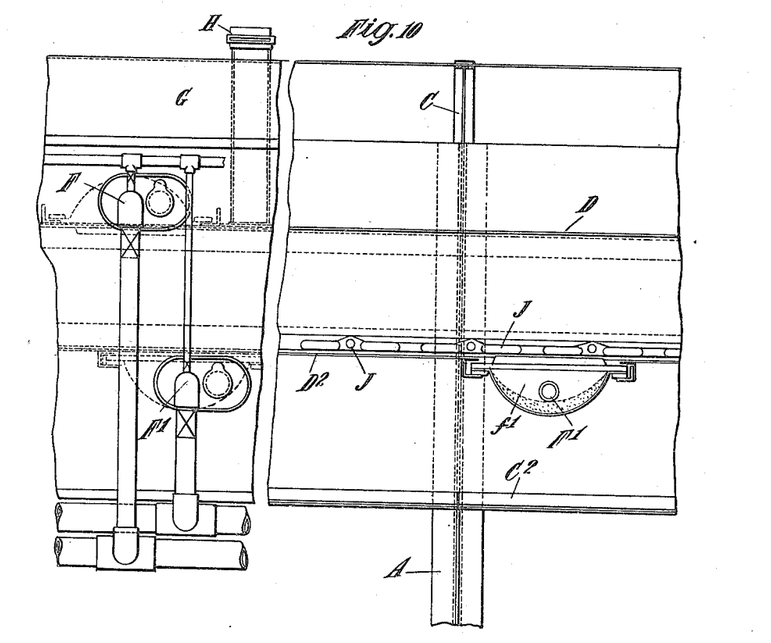
Fig. 10 is an enlarged view of part of the oven, showing details of construction, including pilot lights for the burners.
Figure 12:
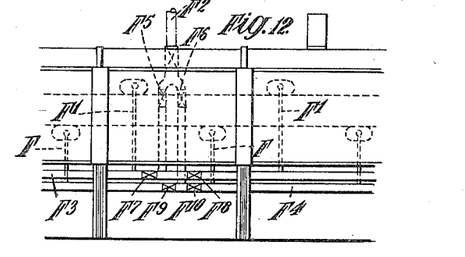
Figs. 12 and 13 are side elevations and plan respectively of a portion of a gas fired oven showing how the same may be controlled.
Figure 13:
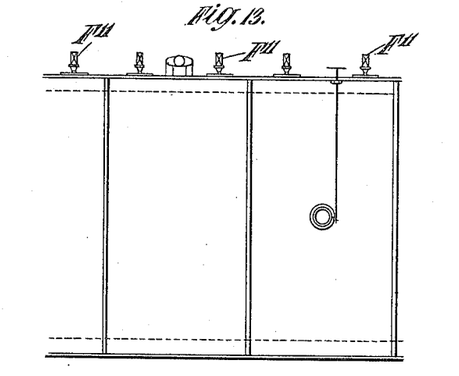

Figs. 12 and 13 show how the gaseous fuel may be fed to the oven and controlled by means of a main feed pipe F² connecting with the supply pipes F³, F⁴ and provided respectively with control valves F⁵, F⁶, the former for controlling the top burners and the latter for controlling the bottom burners. Further control valves F⁷, F⁸ serve also to regulate the top burners and similar valves F⁹, F¹⁰ serve to regulate the bottom burners so that the burners toward the intake end may be controlled independently of the burners toward the delivery end. For individual control of the burners valves F¹¹ are provided in the pipes F, F' see Figs. 10 and 13.

In many cases it is advantageous to provide means for cooling the articles or material after the drying or cooking has been completed. For this purpose the section or a few sections nearest the outtake end of the oven may be utilized for cooling purposes, cool compressed air from a compresser not shown (Fig. 16) being conducted through the aforesaid section by means of pipes 20, the supply of air being regulated by cocks 19.

What I claim and desire to secure by Letters Patent of the United States is:—

1. An oven comprising in combination interchangeable frame sections adapted to be assembled to form a built up frame of any desired length, and interchangeable drying chamber sections also adapted to be assembled end to end.

2. An oven comprising in combination a series of frame sections adapted to be assembled to form a built up frame of any desired length, and a series of cooking chamber sections also adapted to be assembled end to end.

3. An oven comprising a frame built up of series of stock units, a drying chamber within said frame also made up of sections, and means whereby the chamber may be heated.

4. An oven comprising a frame formed from a series of interchangeable sections, a drying chamber also in sections, and means whereby the oven may be heated by the combustion of the fuel medium within the drying chamber.

5. A mechanically operated oven comprising frame sections assembled end to end, drying chamber sections also assembled together, and composite slabs secured to said sections to form the walls, roof and floor of the oven.

6. A mechanically operated oven comprising frame sections assembled end to end, cooking chamber sections also assembled together, and means for heat-insulating said chamber.

7. An oven comprising a frame built up of units assembled end to end, a drying chamber made up of sections assembled together, means for conveying the material to be dried through the chamber, endless conveyer chains for traversing the conveyers and means for supporting said chains so that portions passing through the drying chamber are kept taut.

8. An oven comprising frame sections assembled end to end, a cooking chamber made up of sections also assembled together, means for conveying the material to be cooked, a pair of endless conveyer chains each adapted to travel near one of the edges of the cooking chamber and means for connecting said chains to each other.

9. An oven comprising a frame built up of similar sections, a drying chamber also made up of sections and separable from the frame, composite sheets forming walls and roof of the oven frame, and roof, floor and walls of the cooking chamber, means for mechanically operating said oven, and means for supplying and controlling the heating medium.

10. An oven comprising a frame section adapted together with other similar sections to constitute an oven frame of varying length according to the number of sections employed, means for securing said sections together, a further frame section adapted together with other similar sections to constitute the cooking chamber of the oven, heat insulating slabs secured to said sections so as to afford the walls, roofs and floors of said frame and chamber, means for supplying a heating medium to the cooking chamber, means for conducting the steam, vapor and products of combustion away from the oven, means for heat-insulating the cooking chamber from the frame, means at one end of the oven for supplying the material to be treated and means at the other end for delivering the material.

11. An oven comprising a frame built up from units, a cooking chamber made up of uniform sections, conveying means for the material being treated, means for supplying and regulating the medium for heating said oven, means for conducting away the waste heat, and means for cooling the material after treatment.

ERNEST TURNER.

Copies of this patent may be obtained for five cents each, by addressing the "Commissioner of Patents. Washington, D. C."